United States Patent [19]

Cook et al.

[11] Patent Number: 4,593,860

[45] Date of Patent: * Jun. 10, 1986

[54] METHOD FOR IMPROVING HANDLEABILITY OF CALCINED KAOLIN CLAY PRODUCTS

[75] Inventors: Jerry A. Cook, Cartersville; Robert H. Garner, Sandersville; Ralph E. Turner, Jr.; Bomi M. Bilimoria, both of Tennille, all of Ga.

[73] Assignee: Anglo American Clays Corporation, Atlanta, Ga.

[*] Notice: The portion of the term of this patent subsequent to Dec. 31, 2002 has been disclaimed.

[21] Appl. No.: 667,400

[22] Filed: Nov. 2, 1984

Related U.S. Application Data

[63] Continuation of Ser. No. 341,918, Jan. 21, 1982, abandoned.

[51] Int. Cl.[4] .............................................. B02C 21/00
[52] U.S. Cl. ........................................... 241/23; 241/30
[58] Field of Search ....................... 241/16, 26, 30, 29, 241/184, 23

[56] References Cited

U.S. PATENT DOCUMENTS

| 1,771,477 | 7/1930 | Alton | 241/29 X |
| 1,771,479 | 7/1930 | Alton | 241/29 X |
| 3,774,856 | 11/1973 | Hamilton et al. | 241/184 X |

Primary Examiner—Howard N. Goldberg
Assistant Examiner—Timothy V. Eley
Attorney, Agent, or Firm—Stefan J. Klauber

[57] ABSTRACT

A method for increasing the bulk density and decreasing the time of wetting with water of a substantially anhydrous kaolin clay powder, comprising dry ball-milling said powder using work inputs of from about 5 to about 40 HP-hrs/ton of dry clay. The milling may be effected by grinding the clay with ceramic balls of less than 5 inches diameter. The process enables improved handling characteristics for the treated clay with respect to bulk material handling systems.

8 Claims, No Drawings

METHOD FOR IMPROVING HANDLEABILITY OF CALCINED KAOLIN CLAY PRODUCTS

This application is a continuatiion of application Ser. No. 341,918 now abandoned, filed Jan. 21, 1982.

BACKGROUND OF INVENTION

This invention relates generally to calcined clay products and more specifically relates to a method for treating a substantially anhydrous white kaolin clay powder so as to improve the bulk handling characteristics of same when the product is loaded, unloaded and shipped.

In the course of manufacturing paper and similar products, including paper board and the like, it is well-known to incorporate quantities of inorganic materials into the fibrous web in order to improve the quality of the resulting product. A number of inorganic materials have long been known to be effective for these purposes, such as titanium dioxide, which can be incorporated into the paper in the forms of anatase or rutile. Titanium dioxide, however, is among the most expensive materials which are so usable. Accordingly, in recent years, considerable efforts have been made to develop satisfactory replacements for the said titanium dioxide.

Among the materials which have thus found increasing acceptance as paper fillers are substantially anhydrous kaolin clays. Materials of this type are generally prepared by partially or fully calcining a crude kaolin clay, which may have been initially subjected to prior beneficiation steps in order to remove certain impurities, e.g. for the purpose of improving brightness in the ultimate product. As used in this specification, the term "substantially anhydrous kaolin clay powder" shall include kaolin clays which have been heated to over 400° C. to render same anhydrous. The term thereby embraces fully calcined kaolins—which usually have been heated above the 980° C. exotherm, as well as so-called "metakaolin," which results from heating to lower temperatures—below the exotherm. Reference may be had in the foregoing connection to Proctor, U.S. Pat. Nos. 3,014,836 and to Fanselow et al, 3,586,823, which disclosures are representative of portions of the prior art pertinent to fully calcined kaolins; and to Morris, U.S. Pat. Nos. 3,519,453, to Podschus, 3,021,195 and 3,309,214, and to British Pat. No. 1,181,491, all of which are concerned with kaolins which are calcined to lower temperatures and which therefore can be regarded as metakaolins.

A calcined product having characteristics generally superior to previously available such pigments, is the ALPHATEX® product of Anglo-American Clays Corporation, assignee of the present application. This product again is a substantially anhydrous white kaolin clay pigment, which has unusual efficacy as a filler in paper sheets and similar paper products. The pigment also has application as a coating pigment for paper and as a pigment in paints and other filled systems. It generally consists of aggregates of anhydrous kaolin clay particles, and exhibits exceptionally high light-scattering and opacifying characteristics when incorporated as a filler in paper. The said pigment is a powdered material of quite fine size—typically at least 65% by weight are of less than 2 microns equivalent spherical diameter (ESD). The said pigment exhibits a Valley abrasion value of less than 50 mg. and usually below 30 mg., (as determined by the Institute of Paper Chemistry Procedure 65).

Calcined kaolin clay products such as ALPHATEX® are normally pulverized in a high energy impact mill and air-classified after calcination for the purpose of removing +325 mesh residue (to conform to specification for intended use in paper), or in order to remove larger abrasive particles. Such products are then sold by the manufacturer as a finally pulverized low-bulk density powder, which powder is extremely difficult to handle by conventional bulk handling systems. Because of the difficulties in handling such products, they are typically shipped in bulk in "sparger cars." These are bulk-hopper railroad cars fitted with special valves at the bottom which allow water to be injected into the car upon arrival at the customer's facility. Air is then injected into the car to agitate the water and powdered clay mixture. As soon as possible after the injection of the water and air, the fluid suspension is pumped from the car at about 30%–35% solids into a storage tank.

Because of the low-bulk density of the clay powders, typically only 35 to 40 tons of clay can be loaded into a 4,700/ft$^3$ rail car. The bulk density of this material would be measured in the laboratory to be about 10 to 12 lbs/ft$^3$; this material would pack to about 15 to 17 lbs/ft$^3$ in a fully loaded railroad car.

A further serious problem encountered when using the bulk sparger cars is the difficulty of mixing the dry-powdered calcined kaolin clay powder with water in a car having only air agitation available as a means of mixing.

A laboratory test has been developed which measures the ease with which the dry powder can be admixed with water. This test consists of placing a known volume of water in a beaker, then pouring a known weight of calcined clay on top of the water in the beaker with no agitation of any type and measuring the time it takes for the clay to drop below the surface of the water. The specific test hereinafter referred to in this specification as the "wet-out rate test" is performed as follows: 100 grams of tap water are poured into a 600 ml. beaker. 50 grams of calcined clay are then poured into the beaker while simultaneously starting a stopwatch. As soon as all of the clay has disappeared under the surface of the water without any agitation, the time is noted. The result is reported in terms of time, i.e. seconds.

A "tapped" bulk density measurement procedure is used in the laboratory and is performed as follows: A pretared 100 ml cylinder is completely filled and tapped lightly until the level in the cylinder ceases to drop fairly rapidly. The level is then adjusted to 100 ml and container and clay weighed. The bulk density quoted in lbs/ft$^3$ is then calculated as follows:

$$\frac{\text{wt. of clay (g)} \times 7.48 \text{ gals.} \times 3785 \text{ mls.} \times 1 \text{ lb.}}{454 \text{ g} \times 100 \text{ mls. clay} \times 1 \text{ ft}^3 \times 1 \text{gal.}} = \text{lbs/ft}^3$$

In the past, efforts have been made to increase the bulk density of the calcined powders using compaction equipment, such as bricketting machines or pelletizers. However, these have proved to be unacceptable for several reasons. Among these is that bricketting machines tend to produce hard agglomerates, which are difficult to redisperse in water. This causes problems at the paper manufacturer's slurry make-down facility.

Further, pelletizing equipment which relies upon water as a binder has been found to require the addition of large quantities of water (roughly 40% of the weight of the clay) before acceptable pellets can be formed. This water either increases the shipping costs of the product or increases production costs in that it must be evaporated prior to shipment. Pelletizing equipment relying upon binders other than water also requires large amounts of binder and are found to result in a pelletized product which is difficult to make-down in water after pelletization and drying.

It has been found that one means of improving the wet-out rate of calcined kaolin clay powders is by the addition of dispersant or surfactant in dry from to the dry powder. For example, the addition of 5 pounds dry sodium hexametaphosphate to a ton of calcined kaolin clay powder will reduce the wet-out rate from about 160 seconds to about 80 seconds. This method of improving the wet-out time is expensive, however, and does nothing to increase the bulk density of the powder.

The wet-out rate can also be improved on a laboratory scale by grinding the powder in a small lab grinder using approximately 300 hb hrs energy input per ton of clay. In this way, it has been found that the wet-out time can be reduced substantially.

SUMMARY OF INVENTION

Now in accordance with the present invention, it has been discovered that striking improvements in both the bulk density and the wet-out characteristics of substantially anhydrous kaolin clay powders as aforementioned, can be achieved by dry ball-milling the said kaolin clay powders using energy inputs ranging from about 5 horsepower hours per ton of dry clay up to about 40 horsepower hours per ton of clay, preferably from about 10 to 20 HP-hrs per ton, with about 15 HP-hr per ton being relatively optimal. The said ball-milling may be carried out using apparatus such as a Patterson 6' diameter ×3'6" long continuous ball mill (center feed, peripheral discharge) in which the grinding media comprises porcelain balls of less than 5 inches diameter. Preferably, the grinding media comprises porcelain balls of from ¾" to 2" diameter. Other materials can also be used for the balls—such as stainless steel and the like. The increase of bulk density of the product does not increase the difficulty of making down the product to a residue-free slurry.

It should be appreciated in connection with the present invention that ball-milling is a completely unconventional operation for use with the dry, extremely fine powdered material which is here subjected to such treatment. The material, as indicated, is to begin with largely under 2 microns ESD in particle size; and this type of material is not normally subjected to ball-milling since such techniques are not considered to result in substantial further particle size reduction—which is the usual objective of ball-milling.

The manner in which the dry ball-milling enables the completely unexpected results of this invention is not well understood at present, although it appears that the operation has effects other than size reduction. It appears rather that the particle shape of the components of the powder is altered to enable the objectives above set forth. It is thought that the ball-milling may act upon the particles as to increase the sphericity of same—with resultant improvement in packing and wetting-out characteristics. Of particular significance is that the characteristics of the calcined kaolin clay powder which render same of such great value as a paper filler, are not impaired to any substantial degree by the method of the invention, i.e. all of the desirable characteristics went to the paper by use of such material, such as increase in opacity, high light scattering, etc. remain substantially intact.

DESCRIPTION OF PREFERRED EMBODIMENT

Practice of the present invention is illustrated by the following Examples:

EXAMPLE I

In this and the remaining Examples of the specification, the substantially anhydrous kaolin clay powder subjected to the process of the invention, was the unmodified ALPHATEX® product previously described. The sample used as feed material for this example was initially evaluated and found by the aforementioned test to have a 900 second wet-out time, and a bulk density of 9.7 lbs/ft$^3$. This product was ball-milled using a work input of approximately 15 hp hours/ton of energy, using a 13 inch diameter mill charged with 291 each of ½, ¾, and 1 inch porcelain balls. The resultant product was found to have a bulk density of 23 lbs/ft$^3$. The product was then subjected to the wet-out test, previously described, and was found to have a 21 second wet-out time.

EXAMPLE II

Another sample of the above unmodified ALPHATEX® calcined kaolin clay pigment and exhibitng the same wet-out and bulk density as in Example I, was ball-milled in a 28 inch diameter 29 inches long batch type ball mill using ½ to 1 inch ceramic balls as the grinding media, also as previously described. In this instance, the energy input was 30 hp-hours/ton of dry clay. The resultant product was found to have a bulk density of 22 lbs/ft$^3$ and a wet-out time of 20 seconds.

EXAMPLE III

A sample of unmodified ALPHATEX® calcined kaolin clay pigment having a bulk density of 11.3 lbs/ft$^3$ and a wet-out time of 400 seconds was ball-milled in the apparatus described in Example II using ceramic balls as the grinding media. The energy input was the same as in Example II. The resultant product was found to have a bulk density of 17 lbs/ft$^3$ and the wet-out time of 40 seconds.

EXAMPLE IV

A sample of unmodified ALPHATEX® calcined kaolin clay pigment having a bulk density of 14.3 lbs/ft$^3$, a wet-out time of 163 seconds and an ESD of 94% (±2%) less than 2 micron size by weight, was ball-milled in a Patterson 6' diameter 3'6" long mill using ceramic balls as the grinding media, sized from ¾" to 2 inches. In this instance, the energy input was approximately 15 HP-hrs/ton of dry clay. The resultant product was found to have a bulk density of 19 lbs/ft$^3$, a substantially improved wet-out time of 21 seconds, and a virtually unchanged ESD of 93% (±2%) less than 2 micron size by weight.

EXAMPLE V

A further sample of the aforementioned unmodified ALPHATEX® calcined kaolin clay pigment having a bulk density of 10.5 lbs/ft$^3$, a wet-out time of 600 seconds, and an ESD of 96% (±2%) less than 2 micron size by weight, was ball-milled in a Patterson 6' diameter 3'6" long mill using ceramic balls as the grinding media, sized from ¾" to 2 inches, and an energy input of approximately 15 HP-hrs/ton of dry clay. The resultant product was found to have a bulk density of 18 lbs/ft³, a substantially improved wet-out time of 18 seconds, and again a virtually unchanged ESD of 95% (±2%) less than 2 micron size by weight.

While the present invention has been particulary set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. A method of preparing a calcined kaolin clay powder having increased bulk density and decreased wet-out time comprising:
    (a) heating a kaolin clay powder of fine particle size to at least 400° C. to render same at least substantially anhydrous; and
    (b) dry ball-milling said anhydrous clay powder using a work input in the range of from about 5 to about 40 HP-hrs/ton of dry clay.

2. A method in accordance with claim 1 wherein said dry milling is effected by milling said clay powder with ceramic balls of less than 5 inches diameter.

3. A method in accordance with claim 1, wherein said balls have diameters in the range of from about ¾ to 2 inches.

4. A method in accordance with claims 1, 2, or 3 wherein the work input is the range of from about 10 to 20 HP-hrs/ton of dry clay.

5. A method in accordance with claim 1 wherein said anhydrous kaolin clay powder has been previously pulverized and air classified to remove undesirable larger particles.

6. A method in accordance with claim 1, 2, or 3 wherein at least 65% by weight of said anhydrous kaolin clay powder is of less than two microns ESD.

7. A method in accordance with claim 1 wherein said kaolin clay powder is a metakaolin.

8. A method in accordance with claim 1 wherein said kaolin clay powder is a fully calcined kaolin.

* * * * *